Oct. 11, 1966 S. L. PASTOR ET AL 3,278,694
FOUR TRACK SOUND HEAD MECHANISM
Filed Oct. 10, 1960 2 Sheets-Sheet 1
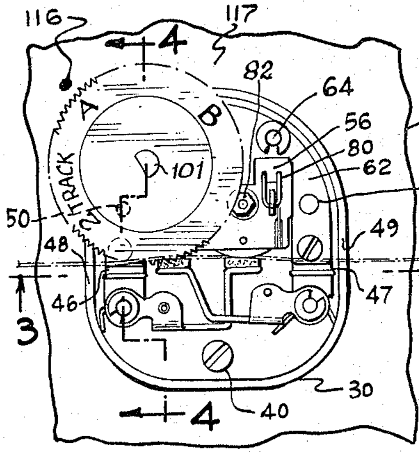
FIG. 2
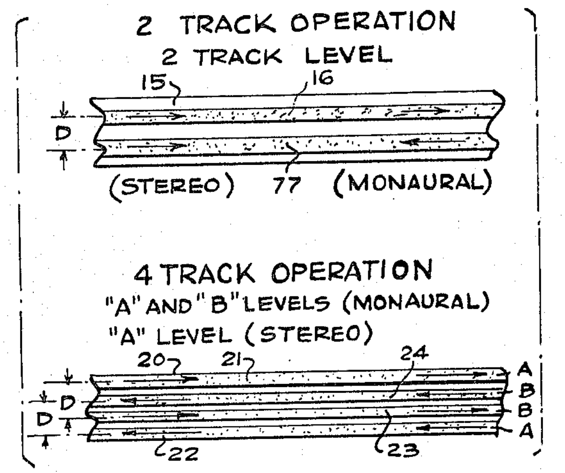
FIG. 1
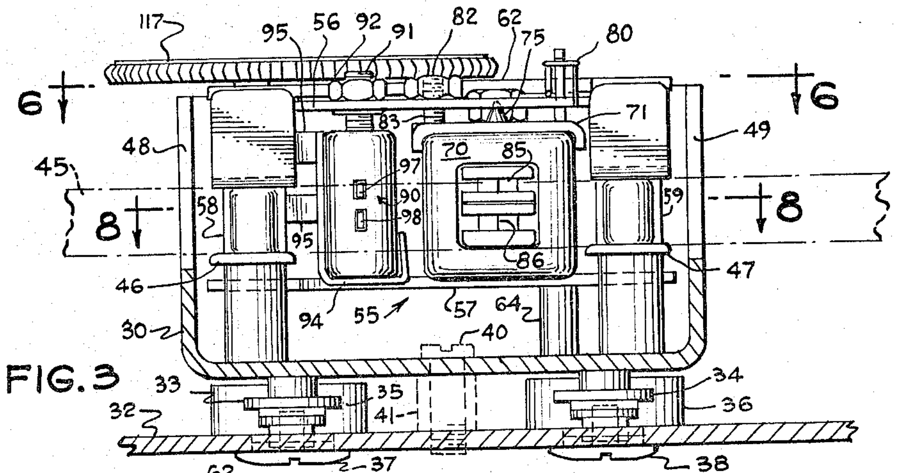
FIG. 3
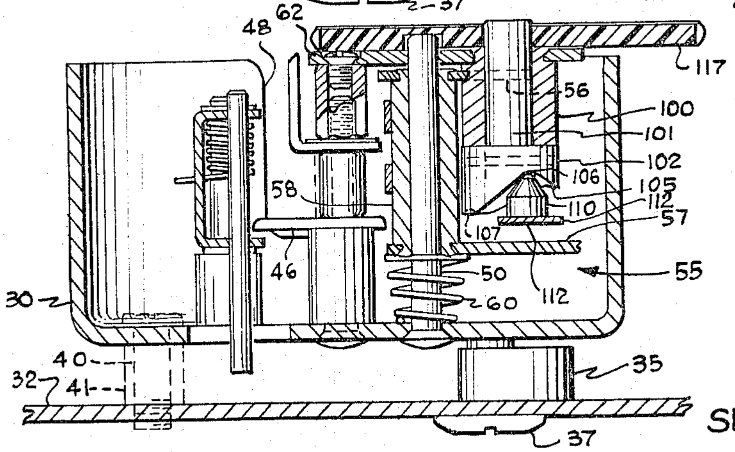
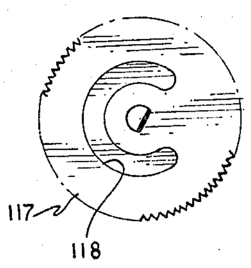
FIG. 5
FIG. 4
INVENTORS
Sheldon Lee Pastor
Robert M. Stahl
BY Zabel, Baker, York, Jones & Dithmar
Attorneys

FOUR TRACK SOUND HEAD MECHANISM

Filed Oct. 10, 1960 2 Sheets-Sheet 2

INVENTORS
Sheldon Lee Pastor
Robert M. Stahl
BY Zabel, Baker, York, Jones & Dithmar
Attorneys United States Patent Office
3,278,694
Patented Oct. 11, 1966

3,278,694
FOUR TRACK SOUND HEAD MECHANISM

Sheldon Lee Pastor, Chicago, and Robert M. Stahl, Argo, Ill., assignors, by mesne assignments, to Minnesota Mining and Manufacturing Company, St. Paul, Minn., a corporation of Delaware Filed Oct. 10, 1960, Ser. No. 61,757
4 Claims. (Cl. 179—100.2)

This invention relates to a four track sound head mechanism for a magnetic tape recorder-reproducer.

It has been found that the standard one-quarter inch magnetic tape currently used in most tape recorders is capable of recording and reproducing on four sound tracks. This enables a single tape to have four lengths of monaural recording or two lengths of stereo recording, thus doubling the capability of the tape compared with prior practice.

In order to provide four track operation with available two track sound heads it is necessary to provide means for selectively adjusting the relative elevations of the tape and associated sound head. The present invention concerns itself with mechanism for adjusting the elevation of the sound head with respect to a fixed tape elevation.

One object of the invention, therefore, is to provide a four track sound head mechanism wherein a two track sound head and associated two track erase head are adjusted in elevation so as to permit both two track and four track operation.

Another object is to provide a four track sound head mechanism which is capable of operation with four tracks in monaural recording and reproducing, and two tracks in stereo recording and reproducing.

Another object is to provide a four track sound head mechanism wherein the sound and erase heads are adjusted in elevation simultaneously to each of three levels with reference to the elevation of the tape. These levels, which are located with precision, may be referred to as the "two track" level (for conventional two track operation), the "A" level (for two track stereo operation and for one group of two tracks in monaural operation) and the "B" level (for the other group of two tracks in monaural operation).

Still another object of the invention is to provide such a mechanism wherein the sound head may be adjusted during production both in azimuth and elevation so as to position a particular sound head exactly with respect to the tape travel path associated with that sound head. These adjustments, which are continuous in character, may be made during actual operation of the tape recorder in which the mechanism is installed, thereby insuring that the individual recorder is adjusted in production for peak performance. Similarly, the associated erase head is adjustable in elevation to match the adjusted elevation of the sound head. The erase head adjustment also is continuous in character and is made in production during actual operation of the recorder.

Another object is to provide a four track sound head mechanism wherein the aforesaid production or factory adjustments of the sound and erase heads are independent of the elevation adjustments made by the user to condition the mechanism at the three levels mentioned above.

Other objects, advantages and details of the invention will be apparent as the description proceeds, reference being had to the accompanying drawings wherein a preferred form of the invention is shown. It is to be understood that the description and drawing are illustrative only, and that the scope of the invention is to be measured by the appended claims.

In the drawings:

FIG. 1 shows fragmentary lengths of tape which illustrate the record and play capabilities of a four track sound head mechanism both in monaural and stereo operation.

FIG. 2 is a top plan view of a four track sound head mechanism embodying the invention.

FIG. 3 is an enlarged sectional view on line 3—3 of FIG. 2.

FIG. 4 is an enlarged sectional view on line 4—4 of FIG. 2.

FIG. 5 is a bottom view of the track selector used in the illustrated sound head mechanism.

Figure 6:
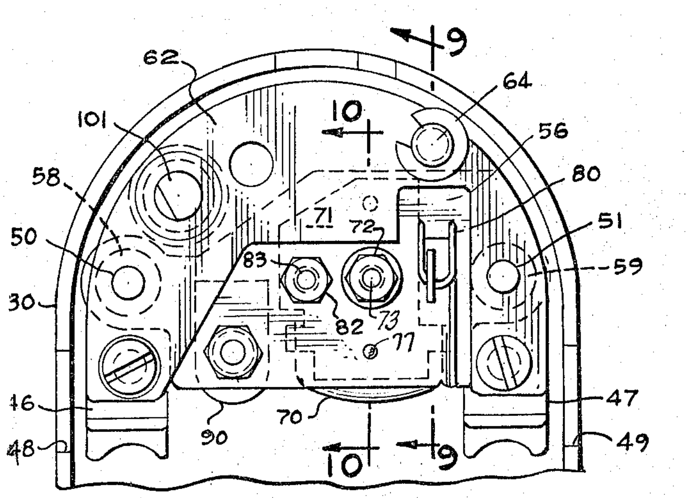
FIG. 6 is an enlarged fragmentary top plan view with the track selector removed, the view taken generally on line 6—6 of FIG. 3.
Figure 7:
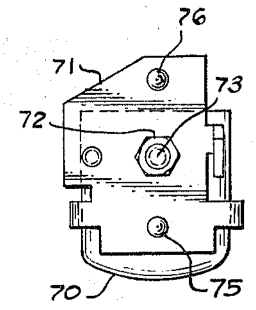
FIG. 7 is a top plan view of the subassembly comprising the record-play head and a pivotal mounting plate for same.

Referring first to FIG. 1 of the drawings, tape length 15 shows the relative locations on the tape of sound tracks 16 and 17 which are used in conventional two track operation in either monaural or stereo recording and reproducing. The arrows at the right on tracks 16 and 17 indicate the directions of tape travel for the respective tracks during monaural operation of the recorder, while the arrows at the left indicate the single direction of the tape for utilizing the two tracks in stereo operation. The sound head mechanism is positioned at the "two track" level for this two track operation.

The dimension "D" applied to tape length 15 indicates the spacing between the centers of the two gaps which are energized and used in the sound head for stereo operation. In monaural operation only one of the gaps is used, e.g. the upper one.

Tape length 20, also shown in FIG. 1, illustrates the four tracks 21, 22, 23 and 24 used in four track operation.

Referring first to monaural four track operation with the mechanism positioned at A level, only the upper gap of the sound head is used for recording and reproducing. In this circumstance tape track 21 is used when the tape travels in the direction indicated by the arrow applied to the track. When the tape is inverted, track 22, which moves in the direction indicated by the associated arrow, is used for recording and reproducing.

When the sound head mechanism is positioned at the B level, the upper gap only of the sound head again is used. However, in response to the B adjustment the entire sound head has been lowered in elevation with respect to the tape path. In this circumstance sound track 23 is used for recording and reproducing when the tape travels in the direction indicated by the arrow. When the tape is inverted and travels in the opposite direction, sound track 24 is used for recording and reproducing.

Four track stereo recording and reproducing occurs when the sound head mechanism is positioned at the A level. In this circumstance tape tracks 21 and 23 are used for the two stereo channels when the illustrated tape length 20 is moving from left to right. When the tape is inverted and moved in reverse direction, tape tracks 22 and 24 are used for the two stereo channels. With this arrangement, the standard one-quarter inch tape accommodates two groups of two stereo tracks, or two complete lengths of stereo operation.

As previously mentioned, the mechanism of this invention employs a fixed elevation for the tape travel path, and provides means for changing the elevation of the sound head in a selective manner. In the illustrated form of the invention three separate levels of head elevation are provided, but the invention is equally adapted to various settings in any reasonable number, as will be seen.

In the form of the invention shown, the high elevation of the sound head assembly is the A level, the middle elevation is the two track level and the low elevation is the B level. In addition to these levels which are set by the user of the tape recorder, the invention, as mentioned, provides production or factory adjustments for the sound head in both elevation and azimuth and for the erase head in elevation. These adjustments, as will be seen, are of the continuous type and are subject to being made when the tape recorder in which the sound head mechanism is installed is in actual operation.

Referring to the remaining figures in the drawings, the illustrated four track sound head mechanism has a support 30. As shown, support 30 includes a cup-shaped member which encloses the mechanism and which in turn is mounted on a chassis plate 32.

FIGS. 3 and 4 illustrate structure which permits supports 30 to be detachably secured to chassis plate 32. This structure also possesses highly advantageous electrical characteristics, as will be seen.

Support 30 has a pair of spaced feet 33 and 34 which have reduced shanks. These feet are located at the rear of support 30. Spacer members 35 and 36 of insulating material are secured by screw means 37 and 38 to the upper surface of chassis plate 32. The spacer members are provided with slots or grooves which detachably receive feet 33 and 34 of support 30. As shown in full line in FIG. 2 and in phantom in FIGS. 3 and 4, a screw 40 extends through the front portion of support 30 and into threaded engagement with chassis plate 32. A spacer 41 extends between support 30 and plate 32.

The structure just described permits the sound head mechanism to be removed easily from the chassis plate for repair or replacement. In addition, the structure avoids the undesirable electrical characteristics which would be occasioned by mounting the sound head mechanism to the chassis plate by conducting connections. If more than one of the connections were conducting, the structure would function as a single turn transformer and generate undesirable fields within cup-shaped support 30. The insulating spacer members 35 and 36 provide a structure which is free of a conducting loop, and thus the creation of unwanted fields within support 30 is avoided.

Figures 8, 9, 10, 11:
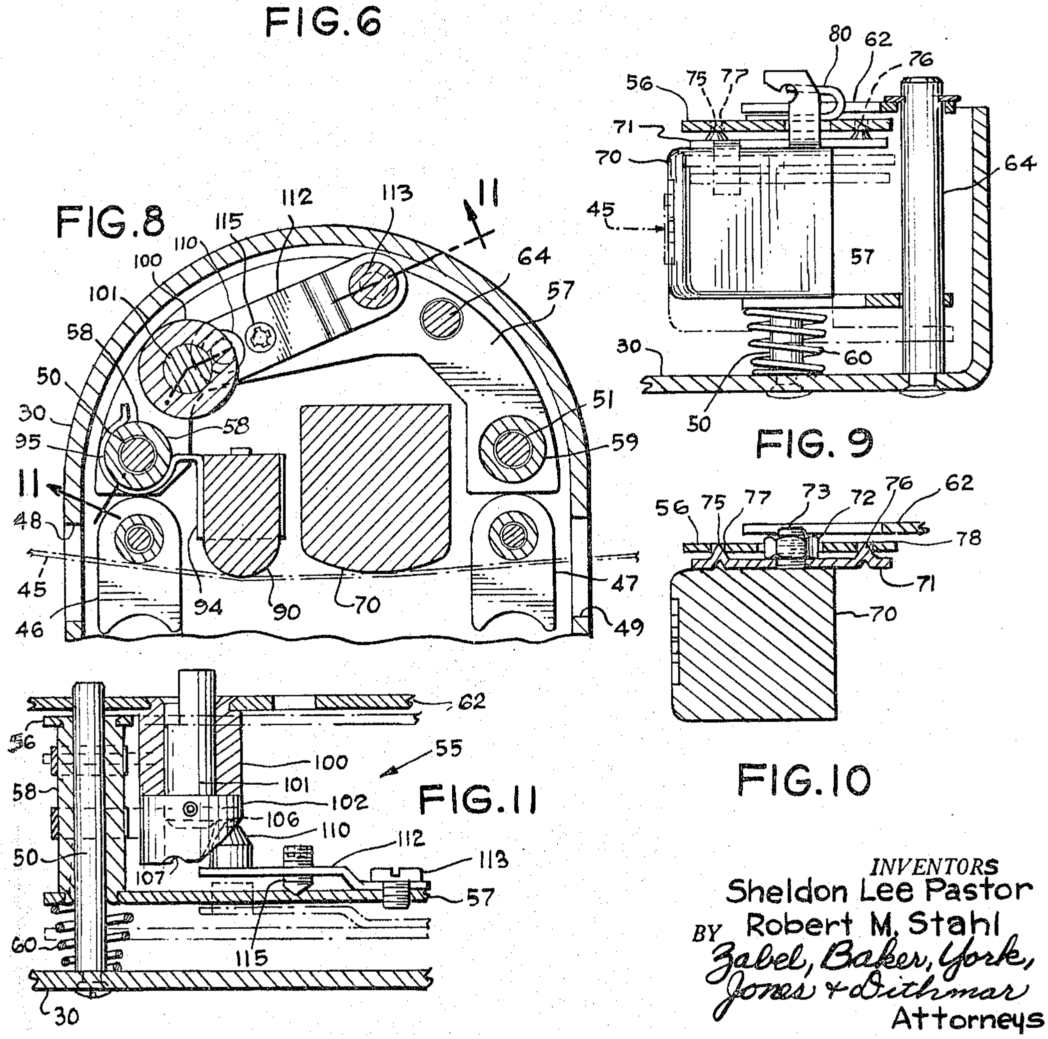
FIG. 8 is a sectional view on line 8—8 of FIG. 3.
FIG. 9 is a sectional view on line 9—9 of FIG. 6.
FIG. 10 is a fragmentary sectional view on line 10—10 of FIG. 6.
FIG. 11 is a sectional view on irregular line 11—11 of FIG. 8 showing details of the vertical adjusting mechanism.

Magnetic tape 45 is shown in broken line in operative relation with the sound head mechanism in FIGS. 2, 3 and 8. The travel path of tape 45 is located at fixed elevation by means of tape guides 46 and 47 which are mounted on support 30. Tape 45 enters and leaves cup-shaped support 30 through slots 48 and 49 in opposing walls of the support.

Immediately to the rear of the spaced tape guides 46 and 47 are a pair of spaced bearing posts 50 and 51. These bearing posts 50 and 51 are mounted on and extend upwardly from support 30. Post 50 is shown in elevation in FIGS. 4 and 11, and the relative locations of the two posts in plan view are best shown in FIGS. 2, 6 and 8. Bearing posts 50 and 51 constitute vertical tracks or guides for a vertically movable carriage which now will be described.

As best shown in FIGS. 3 and 4, vertically movable carriage 55 includes an upper carriage plate 56 and a lower carriage plate 57 secured to a pair of spaced bearing sleeves 58 and 59. The bearing sleeves 58 and 59 respectively slide on bearing posts 50 and 51. The sleeves fit the posts snugly so the travel of carriage 55 is vertical.

Carriage 55 is resiliently biased on either upward or downward direction, and in the illustrated mechanism carriage 55 is biased upwardly by suitable means such as a pair of coil springs 60 which respectively surround posts 50 and 51 and extend between lower carriage plate 57 and support 30. Thus, springs 60 urge carriage 55 upwardly toward a fixed top plate 62 which is secured to the upper ends of tape guides 46 and 47 and to the upper end of a spacer post 64 (FIGS. 2, 3, 6, 8 and 9) which extends upwardly from support 30 and through an opening in lower carriage plate 57. Top plate 62, which also is engaged by bearing posts 50 and 51, is hereinafter sometimes called an upper part of support 30.

A two track sound head 70 for recording and reproducing is mounted for pivotal adjustment on carriage 55. As is well known, sound head 70 must be adjusted in a pivotal manner in order to align the azimuth of the sound head correctly in relation to the travel path of tape 45. In a word, the axis of the gaps of the sound head must be located to form a 90 degree angle with the travel direction of the tape. Due to normal manufacturing inaccuracies it is necessary to adjust the azimuth of each individual sound head after the latter is assembled.

As best shown in FIGS. 3, 6, 7, 9 and 10, sound head 70 is carried by a sound head holder 71. The latter as illustrated is a plate to which head 70 is secured by a nut 72 which is threaded on a stud 73 extending from sound head 70 through holder 71.

Holder 71 has a pair of spaced protuberances 75 and 76 which are received in recesses 77 and 78 (FIG. 10) in upper carriage plate 56. Protuberances 75 and 76 serve to space the body of holder 71 from upper carriage plate 56 so the holder 71 and its associated sound head 70 may be pivoted with respect to upper carriage plate 56 of carriage 55 for the azimuth adjustment.

The right hand side of holder 71 is biased upwardly by suitable means such as spring 80, best shown in FIGS. 3, 6 and 9, which extends between holder 71 and upper carriage plate 56. Pivotal adjustment of holder 71 and associated sound head 70 is accomplished by rotation of nut 82 (FIGS. 3 and 6) which is threaded on a stud 83 secured to holder 71, the stud extending through an aperture in carriage plate 56. Referring to FIG. 3, when adjusting nut 82 is loosened, spring 80 cooperates to pivot holder 71 in counterclockwise direction, and when nut 82 is tightened, holder 71 pivots in clockwise direction.

An azimuth adjustment of sound head 70 causes a slight but significant change in the elevation of the two recording-reproducing gaps, namely upper gap 85 and lower gap 86 (FIG. 3). When an azimuth adjustment is made and the aforesaid elevations change, it is necessary to make a corresponding change in the elevation of the associated erase head which will be described.

Still referring to FIG. 3 an erase head 90 is mounted in carriage 55. Means are provided for adjusting erase head 90 in elevation with respect to carriage 55. As shown, a threaded stud 91 extends upwardly from erase head 90 and through upper carriage plate 56. A nut 92 rotatably mounted on carriage plate 56 receives stud 91. When erase head 90 is fixed against rotation, actuation of nut 92 adjusts the elevation of the erase head.

Erase head 90 is fixed against rotation by means of a bracket 94 (FIGS. 3 and 8) which as shown has arms 95. These arms include resilient loops which partially surround bearing sleeve 58 of carriage 55. The size of the loops are such that they snap tightly on the sleeve 58, thus making bracket 94 effective to prevent rotation of erase head 90 during vertical adjustment. Bracket 94 is such that erase head 90 may move vertically through the slight distance necessary for the elevation adjustment.

As illustrated in FIG. 3, erase head 90 has upper erase gap 97 and lower erase gap 98 which must be aligned exactly with upper gap 85 and lower gap 86 of sound head 70 in order that the erase elements do not erase signals on any portions of the tape other than those directly aligned with the two recording gaps.

The illustrated mechanism for raising and lowering the entire carriage 55 to the three precise levels of elevation mentioned above is best shown in FIGS. 4 and 11. Fixed top plate 62 of support 30 carries a bearing sleeve 100. A cam shaft 101 is journalled in sleeve 100.

The lower portion of cam shaft 101 carries a cam 102 which has "rests" at three different levels of elevation. As best shown in FIG. 4, the intermediate rest for the two track level is designated 105, the upper rest for the A level is designated 106 and the lower rest for the B level is designated 107. Rests 105, 106 and 107 are located in the marginal portions of the free end surface of cam 102.

A cam follower 110 is mounted on lower carriage plate 57 and positioned to engage the marginal portions of cam 102. Cam follower 110 is carried at the free end of arm 112 which in turn is secured to lower carriage plate 57 by suitable means such as screw 113.

A set screw 115 (FIG. 11) is threaded through arm 112 and extends into engagement with lower carriage plate 57. Adjustment of set screw 115 varies the dimension between cam follower 110 and carriage 55, and this in turn varies the level of the carriage with respect to the tape travel path.

The adjustment of set screw 115 is a production or factory adjustment which varies the elevation of carriage 55 and associated heads 70 and 90. This is a continuous adjustment which ordinarily is made during actual operation of the recorder-reproducer so that, for example, tape track 21 (FIG. 1) lies along the upper margin of the tape. When sound head 70 is adjusted in azimuth by means of nut 82, the elevation of the sound head changes slightly, as previously mentioned. In such circumstance set screw 115 is subsequently adjusted in order to restore proper sound head elevation.

Summarizing the production or factory adjustments of the mechanism, sound head 70 is adjusted in elevation by means of set screw 115 and in azimuth by means of nut 82. Erase head 90 is adjusted in elevation by nut 92 in order that the respective gaps of the two heads may be aligned. The azimuth of erase head 90 is not critical and accordingly no azimuth adjustment is provided. As mentioned, the factory or production adjustments all are continuous in character, and are subject to being made under actual operating conditions, that is, with tape 45 actually traveling across the heads.

In addition to the aforesaid factory adjustments, carriage 55 with sound head 70 and erase head 90 is subject to adjustment in elevation by the user of the recorder-reproducer in order to provide two track or four track operation. This adjustment now will be described.

As shown in FIGS. 2, 3 and 4, an adjustment disk 117 is keyed to the upper end of cam shaft 101. Rotation of disk 117 rotates cam shaft 101 and cam 102, thereby bringing one of the three cam rests 105, 106 and 107 into engagement with cam follower 110.

Adjustment disk 117 is marked with indicia, namely two track, A and B, which are indexed to a mark indicated diagrammatically as dot 116. The latter is inscribed on the face plate or other adjacent fixed part of the recorder-reproducer. The angular spacing of the indicia on disk 117 corresponds with the angular spacing of the related cam rests.

In the mechanism illustrated, the setting A of disk 117 positions rest 106 in engagement with cam follower 110, as best shown in FIG. 4. This adjusted position is the upper level of elevation setting for carriage 55 and the two sound heads, and is used for one track of stereo operation and for two tracks of monaural operation, as previously described.

The two track setting of disk 117 positions intermediate rest 105 in engagement with cam follower 110. This setting places carriage 55 and its two heads at an intermediate level of elevation, the travel of the cam length between the two rests 106 and 105 being effective to push cam follower 110 and the carriage downwardly. With this setting the two tape tracks may be used either for one direction stereo operation or two direction monaural operation.

Setting B of disk 117 brings rest 107 into engagement with cam follower 110, thereby moving carriage 55 and its sound heads to their lower level of elevation. This setting is used for the two tracks of four track monaural operation which are not used in setting A.

Adjustment disk 117 may have a recess 118 in its lower surface (FIG. 5) which, if used, receives a fixed member such as the upper end of bearing post 50, as shown in FIG. 4. Recess 118 is a circular segment, the ends of which engage post 50 to serve as stops to limit the rotation of disk 117.

From the above description it is thought that the construction and advantages of the invention will be readily apparent to those skilled in the art. Various changes in detail may be made without departing from the spirit or losing the advantages of the invention.

Having thus described the invention, what we claim as new and desire to secure by Letters Patent is:

1. An adjustable multiple track sound head mechanism for a tape recorder-reproducer comprising:
- a support;
- tape guide means fixed in elevation with respect to said support;
- a vertically movable carriage mounted on said support;
- a sound head holder pivotally mounted on said carriage;
- means pivotally adjusting said holder under operating conditions including single screw means and a bias spring;
- a sound head mounted on said holder;
- an erase head mounted on said carriage;
- a rotatable cam carried by said support and having rests at different levels in elevation;
- a cam follower mounted on said carriage and engaging said cam; and
- means adjusting the elevation of said cam follower in continuous manner with respect to said carriage under operating conditions,
- whereby said sound head may be adjusted in azimuth under operating conditions, and said carriage with said two heads may be positioned in elevation in step by step manner by rotational adjustment of said cam and in minute manner under operating conditions by said last means.

2. A four track sound head mechanism for a tape recorder-reproducer comprising:
- a support;
- tape guides on said support maintaining the tape path at a fixed elevation;
- a pair of spaced bearing posts mounted on and extending upwardly from said support;
- a vertically movable carriage associated with said bearing posts, said carriage including
- a pair of bearing sleeves each journalled on one of said bearing posts,
- spaced upper and lower carriage plates carried by said bearing sleeves;
- resilient means urging said carriage upwardly with respect to said support;
- a sound head holder pivotally mounted on said upper carriage plate;
- a two track sound head carried by said holder;
- means pivoting said holder including single screw means and a bias spring for adjusting the azimuth of said sound head under operating conditions;
- an erase head holder mounted on said carriage;
- a two track erase head carried by said last holder;
- means separate from said pivoting means adjusting said erase head in elevation with respect to said carriage under operating conditions;

a bearing sleeve carried by and extending downwardly from an upper part of said support;
a cam shaft journalled in said sleeve;
a cam on the lower portion of said shaft, said cam having rests at different levels in elevation;
cam follower means carried by said lower carriage plate and engaging said cam; and
means adjusting the elevation of said cam follower means with respect to said carriage under operating conditions
whereby said sound head may be adjusted in azimuth and said erase head may be adjusted in elevation under operating conditions, and said carriage with said two heads may be positioned in elevation in step by step manner by rotational adjustment of said cam and in minute manner under operating conditions by said last means.

3. A four track sound head mechanism for a tape recorder-reproducer comprising:
a support;
a pair of spaced bearing posts mounted on and extending upwardly from said support;
a vertically movable carriage associated with said bearing posts;
resilient means urging said carriage upwardly with respect to said support;
a two track sound head pivotally mounted on said carriage;
means pivoting said sound head including single screw means and a bias spring for adjusting the azimuth thereof under operating conditions;
a two track erase head mounted on said carriage;
means separate from said pivoting means adjusting said erase head in elevation with respect to said carriage under operating conditions;
a vertical bearing sleeve carried by said support;
a cam shaft journalled in said sleeve;
a cam on said shaft, said cam having rests at different levels in elevation;
cam follower means carried by said carriage and engaging said cam; and
means adjusting the elevation of said cam follower means with respect to said carriage under operating conditions
whereby said sound head may be adjusted in azimuth and said erase head may be adjusted in elevation under operating conditions, and said carriage with said two heads may be positioned in elevation in step by step manner by rotational adjustment of said cam and in minute manner under operating conditions by said last means.

4. A four track sound head mechanism for a tape recorder-reproducer comprising:
a support;
a vertically movable carriage mounted on said support;
means urging said carriage in one direction with respect to said support;
a two track sound head pivotally mounted on said carriage;
means pivoting said sound head including single screw means and a bias spring for adjusting the azimuth thereof under operating conditions;
a two track erase head mounted on said carriage;
means separate from said pivoting means adjusting said erase head in elevation with respect to said carriage under operating conditions;
a vertical bearing sleeve carried by said support;
a cam shaft journalled in said sleeve;
a cam on said shaft, said cam having rests at different levels in elevation;
cam follower means carried by said carriage and engaging said cam; and
means adjusting the elevation of said cam follower means with respect to said carriage under operating conditions
whereby said sound head may be adjusted in azimuth and said erase head may be adjusted in elevation under operating conditions, and said carriage with said two heads may be positioned in elevation in step by step manner by rotational adjustment of said cam and in minute manner under operating conditions by said last means.

References Cited by the Examiner

UNITED STATES PATENTS

| | | | |
|---|---|---|---|
| 2,560,569 | 7/1951 | Hare | 179—100.2 |
| 2,680,785 | 6/1954 | Franklin | 179—100.2 |
| 2,898,113 | 8/1959 | Katz | 274—4 |
| 2,933,319 | 4/1960 | Proctor | 179—100.2 |

BERNARD KONICK, *Primary Examiner.*

NEWTON L. LOVEWELL, IRVING L. SRAGOW, *Examiners.*

D. G. REDINBAUGH, J. R. GOUDEAU, P. F. ROTH, *Assistant Examiners.*